Aug. 8, 1961 R. C. MASEK 2,995,738
ELECTRIC MICROMETER
Filed April 9, 1956 2 Sheets-Sheet 1
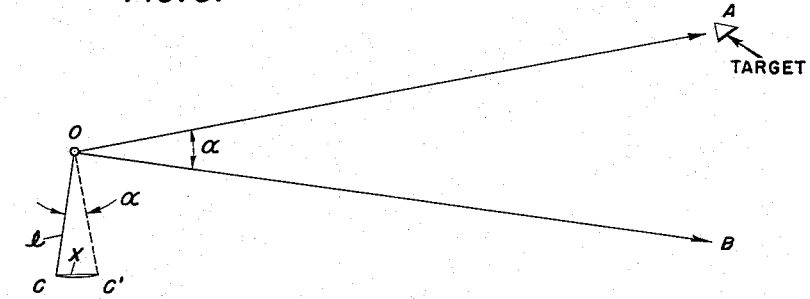
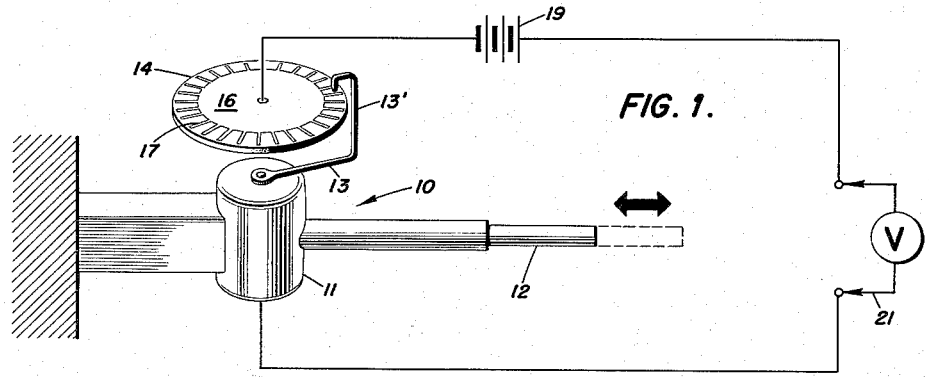
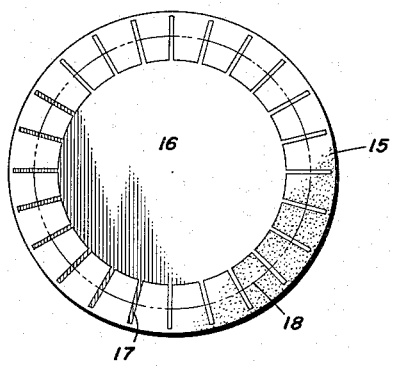
ROLAND C. MASEK
*INVENTOR*
BY
*ATTORNEYS*

Aug. 8, 1961

R. C. MASEK 2,995,738

ELECTRIC MICROMETER

Filed April 9, 1956

ROLAND C. MASEK
INVENTOR

BY
ATTORNEYS

United States Patent Office 2,995,738
Patented Aug. 8, 1961

2,995,738
ELECTRIC MICROMETER
Roland C. Masek, College Park, Md., assignor to the United States of America as represented by the Secretary of the Navy
Filed Apr. 9, 1956, Ser. No. 577,178
3 Claims. (Cl. 343—5)

The present invention relates to an electric micrometer. More specifically, it relates to a means for generating and transmitting an electrical impulse for remotely indicating linear displacements of relatively small magnitudes.

Certain radars have been constructed which employ a single antenna and are mounted to transmit two separate beams. One beam may serve to track a target while the other beam transmits information to guide a missile into collision with the target.

It is desirable that both beam axes accurately coincide. However, beam alignment has not heretofore been accomplished with great accuracy due to the fact that the initial error is small and generally unmeasurable by prior apparatus.

Accordingly, it is an object of this invention to provide a means for the accurate measurement of the angular separation between the centers of two radar beams transmitted by the same antenna system.

Another object is to provide a means for remotely indicating small displacements related to the beam separation.

Still another object is to provide a means for transmitting an electrical impulse upon the occurrence of movement of a transmitting element through an incremental displacement.

Other objects and many of the attendant advantages of this invention will be readily appreciated as the same becomes better understood by reference to the following detailed description when considered in connection with the accompanying drawings, wherein:

FIG. 1 is a diagrammatic drawing of the electrical micrometer of the present invention, with the means for detecting motion of the micrometer indicated schematically;

FIG. 2 is a plan view of the commutator disc element of the present invention;

FIG. 3 illustrates the geometry applicable to the determination of the angular separation of two radar beam centers.

Figure 4:
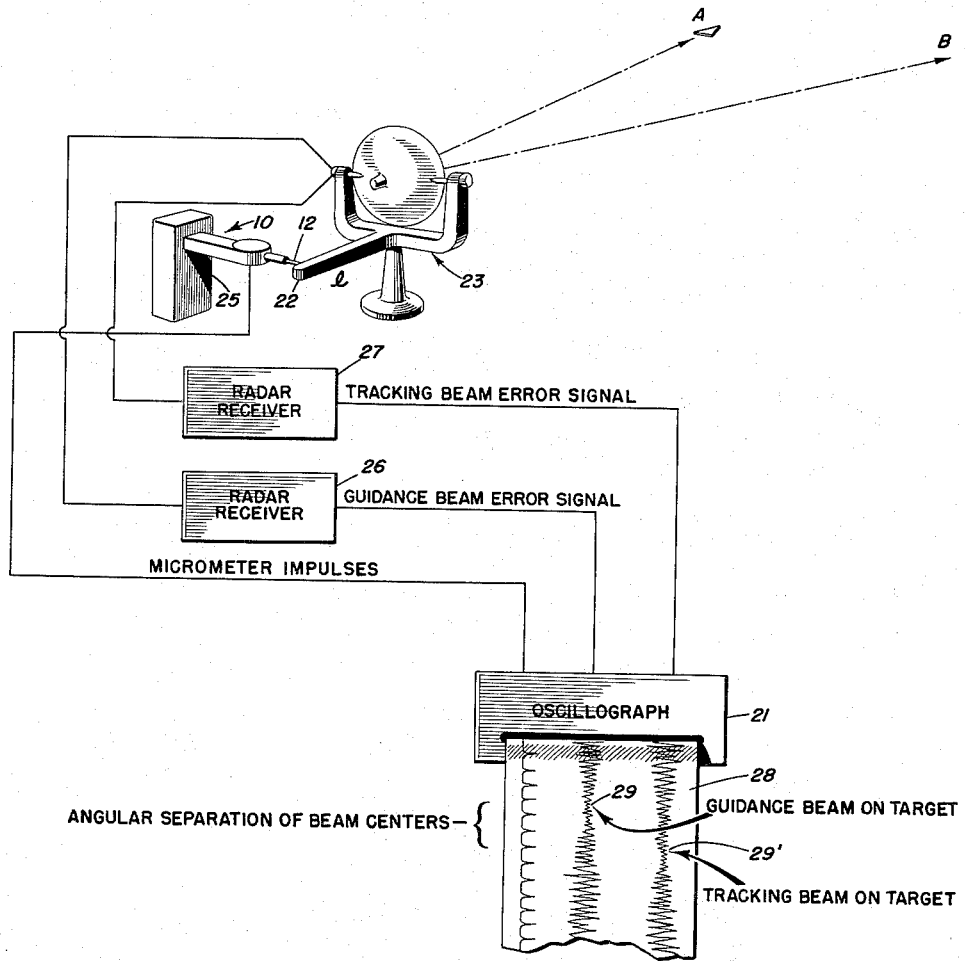
FIG. 4 is a diagrammatic illustration of the application of the micrometer of the present invention to the measurement of radar beam separation.

Referring to FIG. 1, the micrometer 10 combines a commercial dial indicating micrometer including a housing 11, a slidable rod 12, a dial arm 13 having an upwardly extending portion 13', with a commutator disc 14. The housing 11 encloses suitable gearing (not shown) to convert linear motion of slidable rod 12 into rotary motion of dial arm 13. The upwardly extending portion 13' of dial arm 13 wipes the surface of the commutator disc 14.

Details of the commutator 14 are shown in FIG. 2. A circular disc of insulating material 15 forms a base to support concentrically a wafer 16 of conducting material. Thin fingers 17 of conducting material extend outwardly from the edge of wafer 16 along equally spaced radii of the disc, but not so far as the edge of the disc. The point of the dial arm 13 in contact with the commutator describes a circular path as indicated by the dashed circle 18.

The negative terminal of a battery 19 is connected to wafer 16 of the commutator 14. The positive terminal of a voltage indicating device 21 such as a voltmeter or a recording oscillograph, either of which may be located remotely, is connected to the positive terminal of the battery 19. The negative terminal of the voltage indicator is connected to the micrometer housing 11. A voltage indication will thus be obtained only at such times as the arm 13 is in contact with a conducting finger 17 of the commutator to complete the circuit. As rod 12 is moved through a distance x, a number of such circuit completions will occur, resulting in an equal number of deflections of the voltage indicator.

It will be understood that the illustration of the micrometer mechanism is simplified by the omission of supporting means for the commutator 14. In practice, the crystal face of a commercial dial-type micrometer would be removed and the commutator disc would be inserted conductive side down in its place. The micrometer arm would then be bent into a simple L shape to contact the fingers 17.

FIG. 3 illustrates the geometry applied in the azimuthal measurement of the angular separation of radar beam centers. The practical measurement apparatus is shown in FIG. 4. Referring to FIG. 3, the vertical axis of the antenna reflector passes through point O. The horizontal axis of the tracking beam is represented by the line OA, and the corresponding axis of the guidance beam is represented by the line OB. The axes of the two beams are separated by the angle $\alpha$. A bar OC of length $l$ is rigidly attached to the radar reflector mount, and is rotatable therewith to describe an arc CC' upon movement through an angular displacement $\alpha$. The length of the bar OC is known, and the chord $x$ of arc CC' is approximately equal to the arc in length.

Therefore $$\alpha = \frac{x}{l} \text{ radians}$$

Referring to FIG. 4, a horizontal bar 22 is firmly fixed perpendicular to the vertical axis of the reflector mount 23. The electric micrometer 10, constructed as described hereinabove, is attached to a vertical post 25 with its movable rod 12 extending horizontally, and perpendicularly to bar 22. Rotation of the mount thus produces movement of rod 12 equal to the chord length $x$. Correspondingly, electrical impulses are transmitted to an oscillograph 21 as are the error signal outputs of the guidance beam radar receiver 26 and the tracking beam radar receiver 27.

The oscillogram 28 output of oscillograph 21 provides a convenient record of the nulls of the individual beam error signals and the impulses transmitted by the electric micrometer. In use, the antenna mount is rotated until a null 29, 29' for the error signal of each beam is indicated on the oscillogram 28. The number of impulses transmitted by the micrometer which appear in the interval between the nulls on the oscillogram, by a simple mathematical conversion, reveals the angular separation of the beam centers.

For example, an available dial micrometer provides one revolution of dial arm 13 per one-tenth inch displacement of rod 12. The commutator 14 includes forty equally spaced fingers 17 thereby providing an impulse for each .0025 in. movement of rod 12. With the length of bar 22 set at 50 inches each impulses would indicate rotation of mount 23 through .05 milli-radians.

Obviously many modifications and variations of the present invention are possible in the light of the above teachings. It is therefore to be understood that within the scope of the appended claims the invention may be practiced otherwise than as specifically described.

What is claimed is:
1. In combination with a radar system for projecting multiple beams and including a mount movable in azi- muth and an oscillograph for recording simultaneously traces obtained from the beam reflections; apparatus for indicating angular separation of the beam centers; comprising, a micrometer having a fixed disc including conducting and non-conducting segments, an arm moveable over the disc for contacting the segments, means for shifting the arm in accordance with movements of the mount, and electrical connections between said micrometer and said oscillograph.

2. In combination with a radar system for projecting multiple beams and including a mount moveable in azimuth, a tracking beam radar receiver, a guidance beam radar receiver, and an oscillograph for recording simultaneously traces obtained from said receivers; apparatus for indicating angular separation of said beam centers, comprising, a dial-type micrometer having a rotatable arm and a linearly displaceable arm, said rotatable arm being mechanically connected to said displaceable arm so that the motion of said rotatable arm is proportional to the linear motion of said displaceable arm, said displaceable arm responding linearly to movement of said mount, a commutator disc fixed beneath the rotatable arm and having a plurality of conductive and non-conductive segments arranged in alternating sequence on its upper surface, said rotatable arm engaging the segments of said commutator disc upon displacement of said displaceable arm, and electrical means for transmitting to said oscillograph the impulses resulting from the contacting of said conductive segments by said rotatable arm, said impulses producing on said oscillograph a trace indicative of the angular separation of the beam centers.

3. In combination with a radar system for projecting multiple beams and including a mount moveable in azimuth, and an oscillograph for recording simultaneously traces obtained from beam reflections; apparatus for indicating angular separation of the beam centers, comprising, a dial-type micrometer having a rotatable arm and a displaceable arm, said rotatable arm being mechanically linked to a linearly displacement arm so that the motion of said rotatable arm is dependent upon and proportional to the motion of said displaceable arm, the motion of said displaceable arm being dependent upon the motion of said mount, a commutator disc having a plurality of conductive and non-conductive segments arranged alternately about the upper rim thereof, said rotatable arm wiping the segments of said disc upon movement of said mount, a source of electrical potential connected between said conductive segments of said commutator disc and said rotatable arm so that impulses are produced when said rotatable arm contacts the conductive segments of said commutator disc, and means for transmitting said impulses to said oscillograph, said impulses producing on said oscillograph a trace indicative of the angular separation of the beam centers.

References Cited in the file of this patent

UNITED STATES PATENTS

| 1,968,866 | Ames | Aug. 7, 1934 |
| 2,698,932 | Wathen | Jan. 4, 1955 |

FOREIGN PATENTS

| 522,287 | Great Britain | Mar. 31, 1943 |